United States Patent
Bluck et al.

(10) Patent No.: US 10,955,589 B2
(45) Date of Patent: Mar. 23, 2021

(54) OPTICAL COATING HAVING NANO-LAMINATE FOR IMPROVED DURABILITY

(71) Applicant: Intevac, Inc., Santa Clara, CA (US)

(72) Inventors: Terry Bluck, Santa Clara, CA (US); Gaurav Saraf, San Jose, CA (US); James Craig Hunter, Los Gatos, CA (US); Changwan Hwang, San Jose, CA (US); Paul R. Markoff Johnson, Sunnyvale, CA (US); Jae Ha Choi, Pleasanton, CA (US)

(73) Assignee: INTEVAC, INC., Santa Clara, CA (US)

( * ) Notice: Subject to any disclaimer, the term of this patent is extended or adjusted under 35 U.S.C. 154(b) by 259 days.

(21) Appl. No.: 15/996,323

(22) Filed: Jun. 1, 2018

(65) Prior Publication Data

US 2018/0348409 A1 Dec. 6, 2018

Related U.S. Application Data

(60) Provisional application No. 62/513,933, filed on Jun. 1, 2017, provisional application No. 62/651,617, filed on Apr. 2, 2018.

(51) Int. Cl.
| | | |
|---|---|---|
| *B32B 7/02* | (2019.01) | |
| *G02B 1/115* | (2015.01) | |
| *C03C 17/34* | (2006.01) | |
| *C03C 17/42* | (2006.01) | |
| *B82Y 20/00* | (2011.01) | |

(52) U.S. Cl.
CPC .......... *G02B 1/115* (2013.01); *C03C 17/3417* (2013.01); *C03C 17/3435* (2013.01); *C03C 17/3441* (2013.01); *C03C 17/42* (2013.01); *B82Y 20/00* (2013.01); *C03C 2217/734* (2013.01); *C03C 2217/76* (2013.01); *C03C 2217/948* (2013.01); *C03C 2218/155* (2013.01)

(58) Field of Classification Search
CPC .. C08L 1/14; C08L 25/08; C08L 75/04; C08L 1/02; C08L 1/10; C08L 1/12; C08L 2205/02; C08L 2205/06; C08K 5/107; C08K 5/0016; C08K 5/1515; C08K 5/526; B29C 45/0001; B29K 2001/12; B29K 2105/0038; B29K 2995/0017; B29K 2995/0056; C08B 3/06; C08B 3/16
See application file for complete search history.

(56) References Cited

U.S. PATENT DOCUMENTS

| | | |
|---|---|---|
| 2009/0311521 A1 | 12/2009 | Nikolov et al. |
| 2012/0108079 A1 | 5/2012 | Mahajani |
| 2014/0233106 A1 | 8/2014 | Vergoehl et al. |
| 2015/0299470 A1 | 10/2015 | Ngo et al. |

OTHER PUBLICATIONS

List of refractive indices, Wikipedia, May 16, 2017 (May 16, 2017), [retrieved Aug. 9, 2018 (Aug. 9, 2018) via the Internet at <https://en.wikipedia.org/w/index.php?title=List_of_refractive_indices&oldid=780667124>].
International Search Report and Written Opinion dated Sep. 7, 2018, for PCT/US2018/035709, filed Jun. 1, 2018, 12 pages.
International Preliminary Report on Patentability for PCT/US2018/035709, filed Jun. 1, 2018, dated Dec. 12, 2019, 10 pages.
International Search Report and Written Opinion for PCT/US2018/035709, filed Jun. 1, 2018, dated Sep. 7, 2018, 12 pages.
Wikipedia, (May 16, 2017). "List of Refractive Indices" via the internet at https://en.wikipedia.org/w/index.php?title=List_of_refractive_indices&oldid=780667124.

*Primary Examiner* — Lawrence D Ferguson
(74) *Attorney, Agent, or Firm* — Womble Bond Dickinson (US) LLP; Joseph Bach, Esq.

(57) ABSTRACT

An optical coating, such as anti-reflective coating (ARC) or colored coating for optical devices, suitable especially for mobile devices. The ARC is made up of alternating layers of low refractive index and high refractive index. At least one of the layers, preferably the top layer, is made up of nano-laminate. The nano-laminate is a structure of alternating nano-layers, each nano-layer made out of a material having refractive index similar to the layer it replaces. Optionally, each of the layers are made up of nano-laminates, such that a layer having low refractive index is made up of nano-laminates of nano-layers having low refractive index, while high index layers are made up of nano-lamonate of nano-layers having high refractive index. Each of the nano-layers is of 2-10 nanometer thickness.

18 Claims, 3 Drawing Sheets

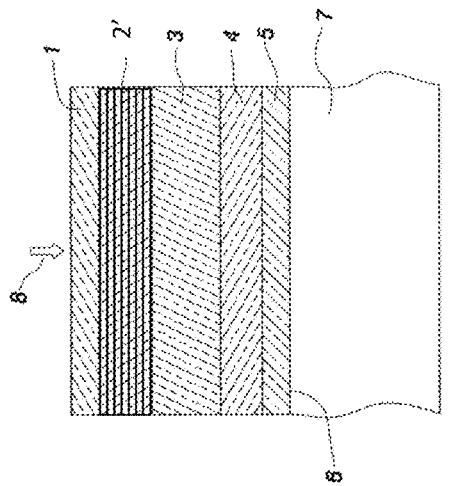
*Figure 1C*
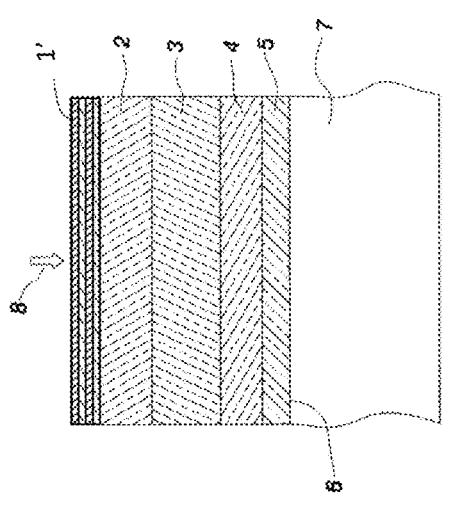
*Figure 1B*
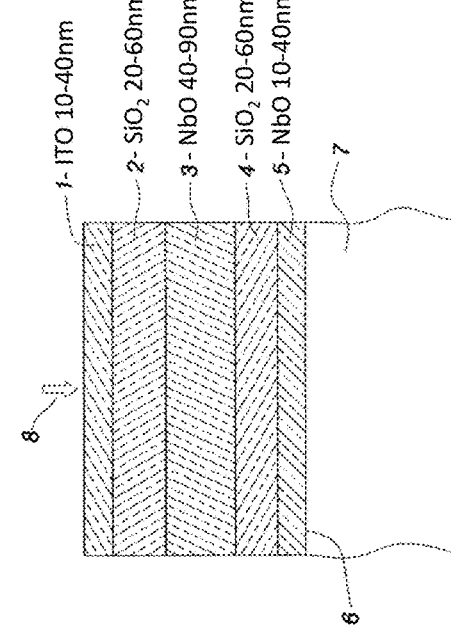
*Figure 1A*
*Prior Art*
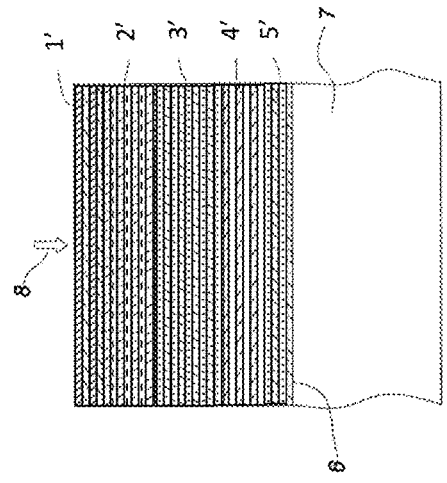
*Figure 1D*
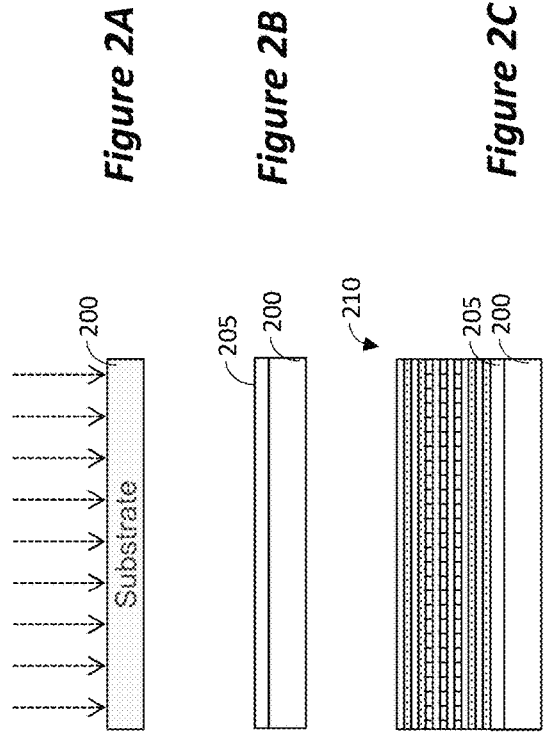
*Figure 2A*
*Figure 2B*
*Figure 2C*

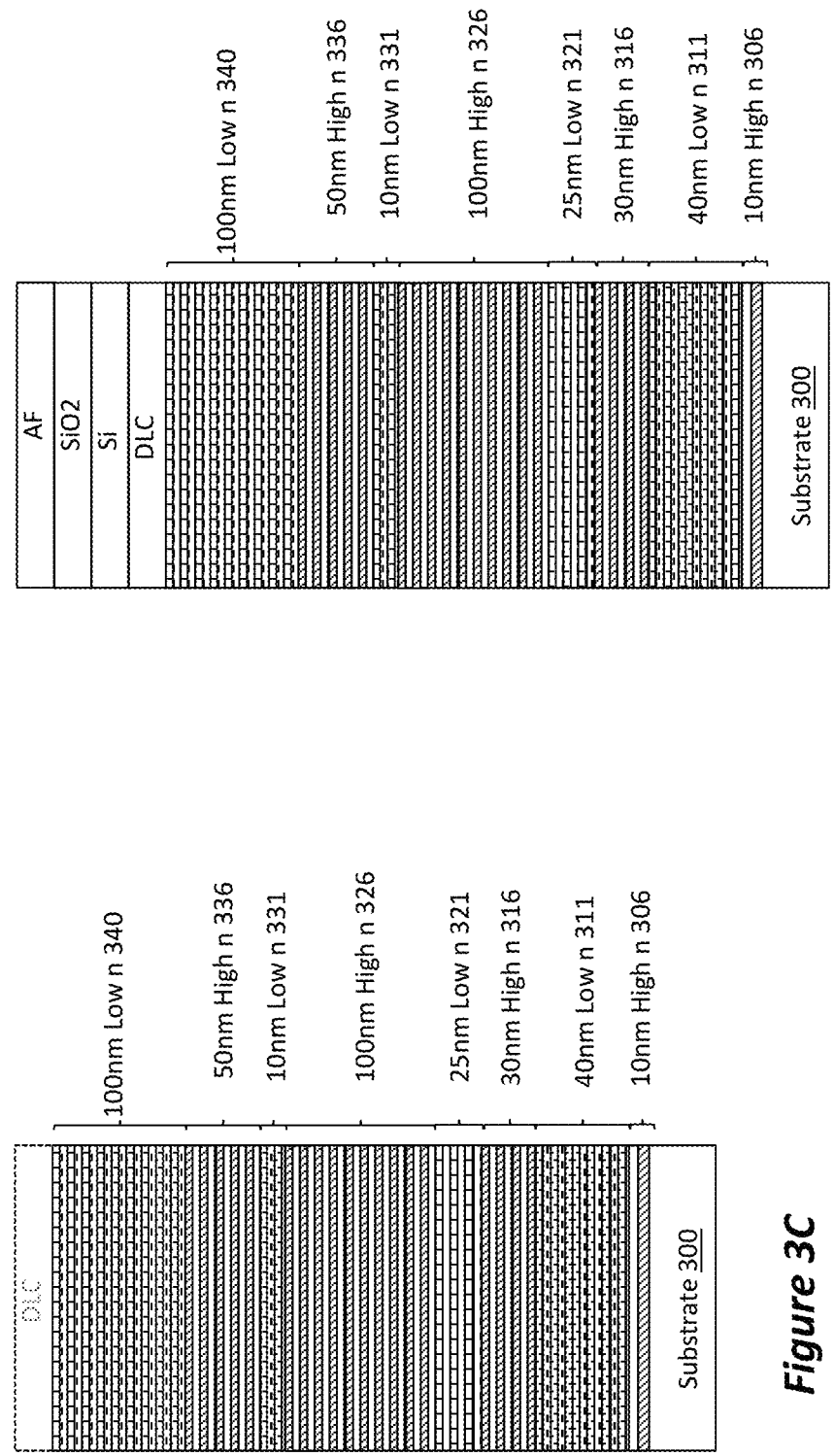

OPTICAL COATING HAVING NANO-LAMINATE FOR IMPROVED DURABILITY

CROSS-REFERENCE TO RELATED APPLICATIONS

This application claims priority from U.S. Provisional Application No. 62/513,933, filed Jun. 1, 2017, and U.S. Provisional Application No. 62/651,617, filed Apr. 2, 2018, the disclosures of which are incorporated herein by reference in their entireties.

BACKGROUND

1. Field

This disclosure relates generally to the field of optical coatings, such as anti-reflective coating, and to the manufacturing of such optical coating.

2. Related Art

Anti-reflective coatings (ARC) are used for many applications, such as, e.g., spectacles, plate glass (e.g., car windshield), flat-screen displays, and touch screens. In many of these applications, the requirements on the ARC include efficient anti-reflective property in the visible wavelength, high transparency, and durability. Of course, these properties need to be achieved in a commercially acceptable cost.

In general, there are two methods for forming an ARC on a substrate, a wet and a dry method. The dry method uses deposition or sputtering to laminate a plurality of thin layers of alternating high and low refractive index. This method offers superior adhesion at inter-layer interfaces and highly accurate control of layers' thicknesses, but requires relatively high production cost. The wet method involves coating the substrate with a wet solution and thereafter drying the solvent. In this method as well, alternating layers of low and high refractive index are formed, so that the process needs to be repeated leading to relatively weak adhesion at the layer's interface, as compared with the dry method.

Examples of wet and dry methods for forming ARC are described in, for example, U.S. Pat. Nos. 9,482,789, 8,358,467, 6,532,112, and 5,106,671.

One problem with conventional ARC is that most high volume, cost competitive methods of creating ARC's do not create a scratch or wear resistant enough coating to be used on devices that are subject to continuous use or used in harsh environments. Mobile devices such as cell phones are an example of an application that cannot be served by conventional ARC coatings. The reason is that any damage to the ARC strongly refracts the light emitted by the screen, thus creating a very visible defect in the device. This highly visible defect obviates the anti-reflecting benefit of the AR coating.

Accordingly, a need exists in the art for improved ARC, which can be used, e.g., in flat panel displays and touch-screens.

SUMMARY OF THE INVENTION

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiments provide an improved optical coating structure having improved optical and mechanical properties, especially high durability and resistance to scratches. The disclosed embodiments utilize manufacturing methods that can be implemented in high volume manufacturing at an acceptable commercial cost.

In the disclosed embodiments the optical coating, e.g., ARC, is formed using a plurality of superlattices, also referred to as nano-laminates, each having nano-layers of alternating refractive index, to create an improved ARC structure. Each superlattice consists of at least two nm-scale layers (i.e., one bi-layer) with alternating compositions and/or crystalline phases, but matching refractive index. The plurality of superlattices are stacked with alternating effective refractive index. The effective refractive index of a superlattice is the average refractive indexes of the two nano-layers making up the bi-layer, weighted by the nano-layers' thicknesses. In the disclosed embodiments each of the nano-layers is of thickness of no more than 30 nanometer, and more typically in the range of 2-10 nm. In some embodiments the entire ARC structure is made of nano-layers. In alternative embodiments a standard ARC layer is formed, wherein one, typically the last, optical layer is made of multiple nano-layers, forming a hard cap layer.

In general aspects, an optical coating is provided, comprising: a plurality of low refractive index layers, each having a first refractive index; a plurality of high refractive index layers each having a second refractive index which is higher than the first refractive index; wherein the low refractive index layers and the high refractive index layers are arranged alternatingly in interlaced manner to form a stack; wherein at least one layer selected from the low refractive index layers and high refractive index layers comprises a nano-laminate layer made up of alternating nano-layers of two different materials.

Disclosed embodiments include a method for forming an optical coating, comprising: providing a transparent substrate; forming a plurality of transparent layers over the substrate by alternatingly forming a first refractive index layer having a first refractive index and a second refractive index layer having a second refractive index a plurality of times; wherein forming a plurality of transparent layers comprises forming at least one layer by: placing the transparent substrate in a sputtering chamber; activating the sputtering chamber to form at least one bi-layer of two nano-layers of different materials, each of the nano-layers having a thickness of 2-10 nanometer, each of the nano-layer formed by sputtering material from a target while simultaneously implanting oxygen or nitrogen ions onto a nano-layer formed over the substrate. The method may further comprise forming a seed layer directly onto the substrate prior to forming the plurality of transparent layers. The method may also comprise forming a diamond-like coating over the plurality of transparent layers. The method may also comprise forming a silicon layer over the diamond-like coating, forming silicon-oxide layer over the silicon layer, and forming anti-finger print layer over the silicon-oxide layer. The method may further include selecting the different materials to have refractive indexes $n_1$ and $n_2$ such that the relationship $(n_1-n_2)/(n_1+n_2) \le 0.07$ is satisfied. The method may further include forming the plurality of transparent layers such that the relationship $(n_f-n_s)/(n_f+n_s) \ge 0.10$ is maintained, wherein $n_f$ is the effective refractive index of the bi-layer and $n_s$ is the refractive index of one of the first refractive index or the second refractive index.

BRIEF DESCRIPTION OF THE DRAWINGS

Other aspects and features of the invention would be apparent from the detailed description, which is made with reference to the following drawings. It should be appreciated that the detailed description and the drawings provides various non-limiting examples of various embodiments of the invention, which is defined by the appended claims.

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 1A illustrates a prior art ARC structure disclosed in U.S. Pat. No. 6,532,112, while FIGS. 1B-1D illustrate modified ARC structures according to embodiments of the invention.

FIGS. 2A-2C illustrate a process for forming an optical coating according to one embodiment.

FIGS. 3A-3C illustrate yet more embodiments of the optical coating, and FIG. 3D illustrates an embodiment with a protective stack of DLC and anti-finger printing layers, with intermediate protective adhesion layers.

DETAILED DESCRIPTION

Figures 3A, 3B:
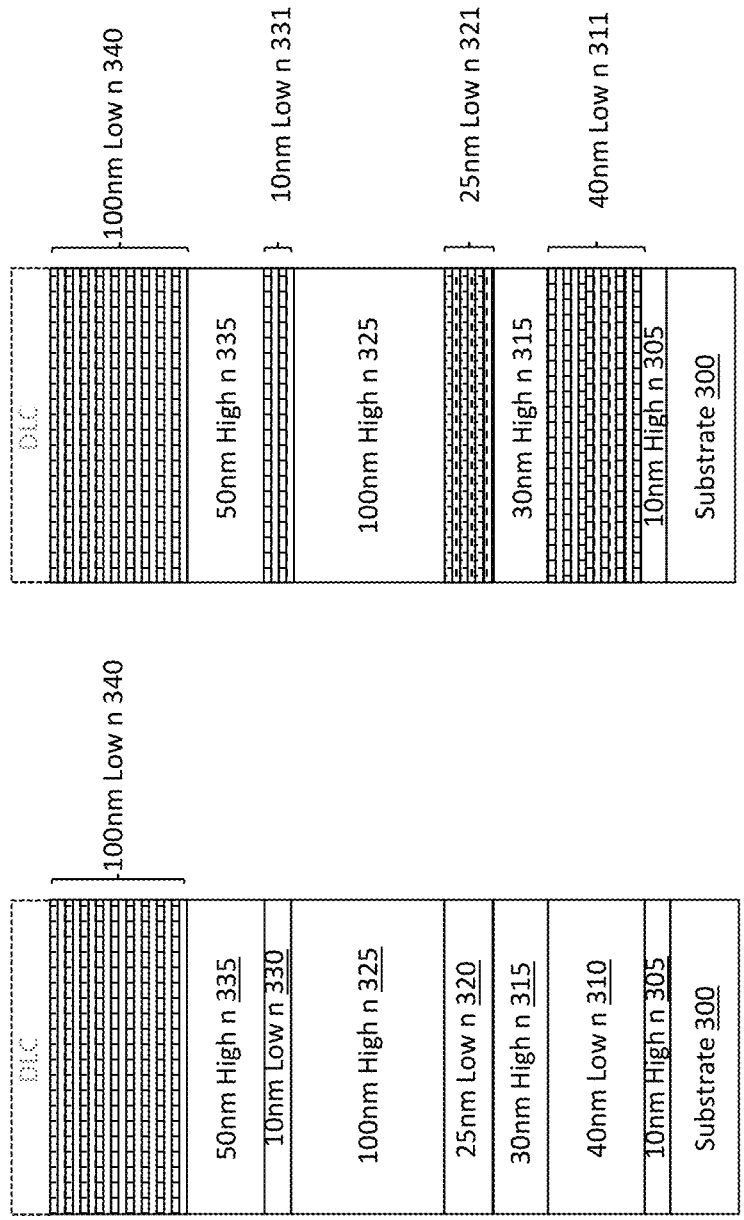

Embodiments of the inventive optical coating and its manufacture will now be described with reference to the drawings. Different embodiments or their combinations may be used for different applications or to achieve different benefits. Depending on the outcome sought to be achieved, different features disclosed herein may be utilized partially or to their fullest, alone or in combination with other features, balancing advantages with requirements and constraints. Therefore, certain benefits will be highlighted with reference to different embodiments, but are not limited to the disclosed embodiments. That is, the features disclosed herein are not limited to the embodiment within which they are described, but may be "mixed and matched" with other features and incorporated in other embodiments.

Disclosed embodiments include methods for forming optical coating having a nano-laminate structure. In the context of this disclosure, the nano-laminates are alternating nano-layers of different composition, each nano-layer having a thickness of no more than 30 nm. In various disclosed embodiments, beneficial results are shown when each nano-layer is 2-10 nm thin. The corrosion, wear, scratch and hardness properties of the nano-laminate structure are much greater than that of the individual films or of a stack of the films in thicknesses greater than 30 nm.

According to disclosed embodiments, the ARC layers can be formed on a variety of crystalline or non-crystalline substrates, such as glass (including treated glass, such as Gorilla Glass®), sapphire, and plastic. However, in the disclosed embodiments the layers are formed while maintaining the substrate at temperatures no higher than 300° C.

FIG. 1A illustrates an ARC structure disclosed in U.S. Pat. No. 6,532,112, while FIGS. 1B-1D illustrate modified ARC structures according to embodiments of the invention. As disclosed by the prior art, the ARC layer shown in FIG. 1A consists of alternating layers of oxide materials having different index of refraction. Thus, in the example of FIG. 1A, layers 2 and 4 are made of SiO2 having refractive index of 1.45-1.50, while layers 3 and 5 are made of NbO having refractive index of 2.1-2.3. The arrangement is capped by an ITO layer having refractive index of 1.9-2.1 at the wavelength of 520 nm.

The disclosed embodiments enhance the performance of the ARC structure by replacing at least one of the ARC layers with a superlattice made of alternating nano-layers of materials having refracting index similar to that of the replaced layer. FIG. 1B illustrates one example wherein the ITO cap layer 1 is replaced by a superlattice nano-laminate of multiple nano-layers 1'. The ITO layer was reported to have a refractive index of 1.9-2.1. Accordingly, in this example the nano-layers are selected to have a similar refractive index. According to one embodiment, the ITO layer 1 is replaced by ten alternating nano-layers of SiN and AlN, each having 2.5 nm thickness, for a total of 25 nm thickness. The SiN has refractive index of 2.05 at the wavelength of 520 nm. The AlN has refractive index of 2.15 at the wavelength of 520 nm. The nano-laminate layer 1' would provide enhanced mechanical properties, making the ARC structure more durable and, as shown below, has an effective refractive index of 2.10, which is the same as that of the ITO it replaces.

FIG. 1C illustrates an embodiment wherein layer 2 is replaced by a nano-laminate structure 2'. Layer 2 was reported to have a refractive index of 1.45-1.50 at 520 nm wavelength. Accordingly, in this example the nano-layers are selected to have a similar refractive index. In this example, nano-laminate structure 2' is made up of 16 alternating layers of SiO and $Al_2O_3$, each of 2.5 nm thickness, for a total of 40 nm. SiO has a reported index of refraction of 1.46 at 520 nm wavelength, while $Al_2O_3$ has a reported index of refraction of 1.77 at 520 nm wavelength. However, when these films are formed using sputtering, as recommended in the subject disclosure, SiO has index of refraction of 1.48-1.50, while $Al_2O_3$ has index of refraction of 1.65-1.67, resulting in effective refractive index of 1.57 (see calculations below).

While each of FIGS. 1B and 1C illustrates an embodiment wherein only one layer is replaced with a nano-laminate, according to disclosed embodiments any number of layers can be replaced by nano-laminates of materials having similar refractive index. In fact, in some embodiments all of the layers may be replaced, as shown in the example of FIG. 1D.

In the example of FIG. 1D, the ITO cap layer 1 is replaced by nano-laminate layer 1' made up of ten alternating nano-layers of SiN and AlN, each having 2.5 nm thickness, for a total of 25 nm thickness. Layer 2 is replaced by nano-laminate layer 2' made up of 16 alternating layers of SiO and $Al_2O_3$, each of 2.5 nm thickness, for a total of 40 nm. Layer 3 is replaced by nano-laminate layer 3' having twenty alternating nano-layers of SiN and AlN, each having 3 nm thickness, for a total of 60 nm thickness. Layer 4 is replaced by nano-laminate layer 4' made up of ten alternating layers of SiO and $Al_2O_3$, each of 2.5 nm thickness, for a total of 25 nm. Layer 5 is replaced by nano-laminate layer 5' having six alternating nano-layers of SiN and AlN, each having 3 nm thickness, for a total of 18 nm thickness.

The materials for each layer of the nano laminate have to be chosen carefully. To function as an optical coating the refractive index of the low AR layer nano-laminate stack should be as low as possible and the refractive index for the high AR layer nano-laminate stack should have as high as possible refractive index. However, refractive index is not the only important property. For a robust nano-laminate stack, the hardness, shear modulus and stress of the individual nano layers is critical as well. The high index nano-layers can be made of combinations of the following (stoichiometric and non-stoichiometric) optical films: ZrO, Y—ZrO, AlN, SiN, ZrN, TiO, CrO, CrN, CrTiO, and CrTiN. The low refractive index nano layers can be made from combinations of the following films: SiO, AlO, SiON, SiAlO.

In this context, it should be appreciated that the terms low refractive index and high refractive index are not used as quantitative measurement, but rather as relative descriptors enabling distinction between the alternating layers. What is important in the ARC context is not the specific values of the refractive index, but that the low refractive index layers have a refractive index value that is sufficiently lower than that of the high refractive index to bring about the required optical effect.

Also, it is important that the refractive index of the nano-layers be matched for their purpose in the optical stack. For each of the high and low nano-layers the closer the refractive index of the materials making up the two alternating nano-layers, the better the optical performance. In fact, if the refractive indexes of the two nano-layers within a nano-laminate are equal, there is no optical degradation, since the amount of light reflected at an optical interface is proportional to $(n1-n2)/(n1+n2)$. The result of $(n1-n2)/(n1+n2)$ should ideally be less than 0.07 for the nano-layers within a nano-laminate layer, and greater than 0.1 between the high and low index nano-laminate stacks.

Looking at the example of FIG. 1D, the difference of the refractive index for the high refractive index nano-laminate (e.g., layers 1', 3' and 5') is: $(n1-n2)/(n1+n2)=(2.15-2.05)/(2.15+2.05)=0.02$. The difference of the refractive index for the low refractive index nano-laminate using reported values would be: $(n1-n2)/(n1+n2)=(1.77-1.46)/(1.77+1.46)=0.09$, which is above the required 0.07. Therefore, as disclosed herein, it is advantageous to form the layers by sputtering. Using the sputtering values, one obtains $(n1-n2)/(n1+n2)=(1.67-1.48)/(1.67+1.48)=0.06$, which is within the required 0.07. The difference between the high and low is calculated by taking into account the thickness ratio of the two layers. Nano-laminate 1' has an effective refractive index of: $[(t1*n1)+(t2*n2)]/(t1+t2)$, wherein t=thickness. Thus, $[(2.5*2.05)+(2.5*2.15)]/5=2.10$. The effective refractive index of layer 2' is $[(2.5*1.48)+(2.5*1.67)]/5=1.57$. Consequently, the difference between these two layers is: $(n1-n2)/(n1+n2)=(2.10-1.57)/(2.10+1.57)=0.14$.

Incidentally, while in the examples of FIGS. 1B-1D all of the nano-layers within a nano-laminate have the same thickness, this doesn't need to always be the case. For example, the effective refractive index of layer 1' can be increased by making the AlN nano-layer thicker than the SiN nano-layer. For example, the AlN can be set to 6 nm and the SiN to 3 nm, in which case the effective refractive index would be: $[(3*2.05)+(6*2.15)]/9=2.12$. Similarly, to lower the effective refractive index of layer 2', one may set: $[(5.5*1.46)+(2.0*1.67)]/7.5=1.52$.

As can be seen from the above disclosure, each nano-laminate comprises multiple nano-layers made up of two different materials of similar refractive index, wherein the nano-layers are stacked alternatingly. Thus, one can speak of bi-layers, wherein each bi-layer is a stack of two nano-layers, each made of different materials, but having similar refractive index. In this context, the reference to similar refractive index means that the value of the refractive index of one layer within a bi-layer of one nano-laminate is closer to the refractive index value of the other nano-layer within the bi-layer than to the refractive index of nano-layers within a different nano-laminate. That is, the two materials making up the bi-layer of low refractive index nano-laminate have values closer to each other than to the refractive index of any of the bi-layers making up the high refractive index nano-laminate.

Generally, to improve the corrosion, wear, scratch and hardness of the coating, the bilayers are made of nano-layers each having thickness from 2-10 nanometers. The bi-layers are used to form a plurality of nano-laminates that alternate in refractive index, so as to generate the desired optical effect. In some embodiments, a reflective coating is created. Reflective coatings can be formed, e.g., on the backside of mobile devices. In these cases, the optical stack is designed to reflect a desired color, such that the mobile device appears colored. Reflective coatings are designed in half wavelength (½λ) stacks. Conversely, antireflective coatings are formed on the display side of the mobile devices to eliminate or diminish light reflection from the screen. The antireflective coatings are designed in quarter wavelength stacks (¼λ). The wavelength is the wavelength that is sought to be reflected by the stack. Thus, to create an effective ARC that reflects broad wavelengths, the multiple nano-laminates should be formed to have different thicknesses.

In disclosed embodiments the nano-layers are made of metal oxides, nitrides or oxynitrides. Some examples include: YsZ, $Al_xO_y$, AlN, $Si_xN_y$, AlSiO, and SiON. In some embodiment, an adhesion or seed layer is deposited first, and may be of materials such as ITO, SnxOy, and WOx. Also, in preferred embodiments the various layers are formed using ion beam assisted deposition (IBAD), such that the target material is made of the metal to be deposited and the oxygen or nitrogen are ion implanted during deposition. Thus, the sputtering process is performed in metal mode (also referred to as Metamode) wherein the target is sputtered as a (non-oxidized) metal, typically by Argon ions, and the very thin film that is formed on the substrate (~1 nm typically) is converted into an oxide or nitride by hitting the deposited metal with $O_2$ or $N_2$ ion beam. For example, the target for the sputtering may be made of pure silicon or aluminum, while the ion beam includes $O_2$ or $N_2$, with or without argon, to form layers of SiO, SiN, AlO, etc. Also, in preferred embodiments the ratio ion current to atom arrival rate is less than 0.5, and the ions have potential energy no higher than 600 eV.

In some embodiments, the refractive index of any layer can be changed by alloying the material. For example, MgO can be used to alloy a high refractive index material such as ZrOx or a low index material such as AlOx. The alloying can be done by adding about 8-10% of MgO, which will lower the crystallization temperature of the layer. In another example, about 10-12% of chromium can be alloyed with titanium to improve toughness. Anatase, one of the three mineral forms of titanium dioxide, has a high refractive index of 2.4, but has low hardness, and is therefore a good candidate for alloying. Titanium itself can be used as alloying agent to change refractive index. Tantalum can be alloying agent to change properties of high refractive index material, while Boron can be alloying agent to change the properties of a low refractive index material.

FIGS. 2A-2C illustrates a process for forming an optical coating according to one embodiment. In FIG. 2A process may start by treating the surface of the substrate 200, e.g., using plasma or ion bombardment. The plasma or ion bombardment may include argon and/or hydrogen species.

In FIG. 2B a seed layer 205 is formed on the surface of the substrate 200 to set crystal growth pattern and/or improve adhesion. The seed layer 205 may be of materials such as ITO, SnxOy, and WOx, and is formed using ion beam assisted deposition. In FIG. 2C the nano-laminate layers 210 are formed over the seed layer 205.

Turning to FIG. 3A, an optical coating, in this example an ARC, is illustrated, which is partially made up of standard layers and partially of nano-laminate. In this example the substrate 300 may be glass, e.g., front glass of a mobile phone or other mobile devices or touch screens. When applied onto the glass of a display, ARC can provide increased battery life and improve the visibility of the displays in bright light. However, scratches to the coating create unsightly areas on the device. This cosmetic damage is highly visible and makes the usage of these films undesirable for high wear and use applications. Also the stress in the films used in prior art optical stacks can be very high. This can create an increase in breakage if the device is dropped or receives an impact to the glass surface. Breakage is large cause of warranty returns for mobile device manufacturers and the risk of increased breakage makes the use of the films undesirable to the manufacturer. Therefore, the embodiment of FIG. 3A is provided in order to increase the durability of the coating, so that it can be used in display devices.

The coating of FIG. 3A includes multiple layers of alternating high and low refractive index. The first layer is a conventional thin layer 305 of high refractive index, having thickness of 10 nm. This layer, as well as all of the remaining high n layers, are made of $Si_3N_4$, having refractive index of 2.02. The second layer, 310, is a conventional layer of 40 nm low refractive index, in this case made of $SiO_2$, having refractive index of 1.48. This follows by a 30 nm of high n layer 315, a 25 nm layer of low n 320, a 100 nm layer of high n 325, a 10 nm layer of low n 330 and a 50 nm layer of high n 335. All of the high n layers being made of $Si_3N_4$ and all of the low n layers being made of $SiO_2$. Traditionally, the last layer would have been a layer of low n, e.g., a 100 nm $SiO_2$ layer. However, in the embodiment of FIG. 3A, the top layer is made of a nano-laminate of ten bi-layers, each bi layer being made of a 5 nm nano-layer of $SiO_2$ and a 5 nm nano-layer of a material having refractive index closer to that of $SiO_2$ than that of $Si_3N_4$, which in this example is $Al_2O_3$, having refractive index of 1.67 when formed by sputtering. Consequently, the effective refractive index of the top layer 340 is: $[(5*1.48)+(5*1.67)]/10=1.57$, which is closer to the low index of $SiO_2$ than the high index of $Si_3N_4$.

Thus, in general, the embodiment of FIG. 3A provides an optical coating comprising a plurality of first layers having a first refractive index; a plurality of second layers having a second refractive index different from the first refractive index; wherein the plurality of first layers and the plurality of second layers are formed alternatingly in an interlaced manner over a substrate, terminating with one layer from the plurality of second layers; and a top layer formed over the one layer, the top layer comprising a nano-laminate having a plurality of bi-layers, each bi-layer comprising two nano-layers made of different materials, such that the effective refractive index of the top layer has a value closer to the first refractive index than the second refractive index. Also, the two different materials are chosen such that the expression $(n_1-n_2)/(n_1+n_2) \leq 0.07$ is satisfied, wherein $n_1$ and $n_2$ are the refractive indexes of the two different materials. It is also desirable that the resulting effective refractive index $n_{eff}$ of the top layer satisfies the expression $|(n_{eff}-n_s)/(n_{eff}+n_s)| \geq 0.10$, wherein $n_s$ is the second refractive index.

FIG. 3B illustrates. Another embodiment for optical coating, which would replace the structure of FIG. 3A. The embodiment of FIG. 3B provides increased durability, but also enables modifying the effective refractive index of the low refractive index layers. Specifically, in FIG. 3B all of the high n layers are standard layers, while all of the low n layers are nano-laminates. Layer 311 is made up of four bi-layers, each bi-layer having 5 nm nano-layer of $SiO_2$ and a 5 nm nano-layer of $Al_2O_3$, for a total of 40 nm. Layer 321 is made up of, e.g., three 5 nm nano-layer of $SiO_2$ interlaced with two 5 nm nano-layer of $Al_2O_3$, for a total of 25 nm. Layer 331 is made up of one bi-layers having 5 nm nano-layer of $SiO_2$ and a 5 nm nano-layer of $Al_2O_3$, for a total of 10 nm. Layer 340 is made up of ten bi-layers, each bi-layer having 5 nm nano-layer of $SiO_2$ and a 5 nm nano-layer of $Al_2O_3$, for a total of 100 nm. Consequently, while using standard ARC layers the high n would have been 2.02 and the low n would have been 1.48, in the embodiment of FIG. 3B the high n is still 2.02, but the low n is 1.57.

Alternatively, in order to keep the low refractive index closer to that of $SiO_2$, The bi-layers may be made of $SiO_2$ and SiON. SiON is formed by adding flow of nitrogen containing gas, such as $N_2O$. Depending on the flow of $N_2O$ during the fabrication, the refractive index of SiON can be tuned to 1.46–1.56. Thus, even at the high end, one obtains: $(1.56-1.46)/(1.56+1.46)=0.03$, which is well within the required 0.07. Similarly, the bi-layer may be made of $SiO_2$ and SiAlO. SiAlO has refractive index of about 1.50, so one obtains $(1.50-1.46)/(1.50+1.46)=0.01$, which is well within the required 0.07.

Thus, in general the embodiment of FIG. 3B provides an optical coating comprising a plurality of first layers having a first refractive index $n_1$; a plurality of second layers having a second refractive index $n_2$ different from the first refractive index; wherein the plurality of first layers and the plurality of second layers are formed alternatingly in an interlaced manner over a substrate; and wherein each of the plurality of second layers comprises a nano-laminate having at least one bi-layer, each bi-layer comprising a first nano-layer having a third refractive index $n_3$ and a second nano-layer having a fourth refractive index $n_4$, such that the effective refractive index of each nano-laminate equals the second refractive index, i.e., $n_{eff}=n_2$. In this respect, the effective refractive index satisfies the expression $|(n_{eff}-n_1)/(n_{eff}+n_1)| \geq 0.10$. The effective refractive index is a weighted average of the refractive indexes of the nano-layers, and can be expressed as: $n_{eff}=[(t_3*n_3)+(t_4*n_4)]/(t_3+t_4)$, wherein $t_3$ and $t_4$ are the thicknesses of the respective nano-layers. Also, the first nano-layer and the second nano-layer are selected such as to satisfy the expression: $|(n_3-n_4)/(n_3+n_4)| \geq 0.07$.

A further example of an optical coating is illustrated in FIG. 3C. In the embodiment of FIG. 3C all of the layers are nano-laminates. The low n laminates are the same as described with respect to FIG. 2B, but the high n layers have also been replaced with nano-laminates. In this example, the first layer, 306, is one bi-layer of one 5 nm AlN nano-layer and one 5 nm $Si_3N_4$. Layer 316 is a nano-laminate of three bi-layers, each bi-layer made up of one 5 nm AlN nano-layer and one 5 nm $Si_3N_4$. Layer 326 is a nano-laminate of ten bi-layers, each bi-layer made up of one 5 nm AlN nano-layer and one 5 nm $Si_3N_4$. Layer 336 is a nano-laminate of five bi-layers, each bi-layer made up of one 5 nm AlN nano-layer and one 5 nm $Si_3N_4$. Consequently, the effective refractive index of the high n laminates is $[(5*2.02)+(5*2.15)]/10=2.085$.

Thus, in general the embodiment of FIG. 3C provides an optical coating comprising a plurality of first layers having a first refractive index; a plurality of second layers having a second refractive index different from the first refractive index; wherein the plurality of first layers and the plurality of second layers are formed alternatingly in an interlaced manner over a substrate; wherein each of the plurality of first layers comprises a first nano-laminate having at least one bi-layer made of two nano-layers of different materials, such that the effective refractive index of the first nano-laminate equals the first refractive index; and wherein each of the plurality of second layers comprises a second nano-laminate having at least one bi-layer, each bi-layer comprising two nano-layer of different materials, such that the effective refractive index of the second nano-laminate equals the second refractive index.

Also, in general the embodiment of FIG. 3C provides an optical coating comprising a plurality of first layers having a first refractive index; a plurality of second layers having a second refractive index different from the first refractive index; wherein the plurality of first layers and the plurality of second layers are formed alternatingly in an interlaced manner over a substrate; wherein each of the plurality of first layers comprises an oxide nano-laminate having at least one oxide bi-layer made of a first oxide nano-layer and a second oxide nano-layer of different material than the first oxide nano-layer, such that the effective refractive index of the oxide nano-laminate equals the first refractive index; and wherein each of the plurality of second layers comprises a nitride nano-laminate having at least one nitride bi-layer made of a first nitride nano-layer and a second nitride nano-layer of different material than the first nitride nano-layer, such that the effective refractive index of the nitride nano-laminate equals the second refractive index.

The nano-layers need to have their material properties controlled, (stress, hardness, stoichiometry). For this purpose, reactive sputtered ion assisted deposition is the preferred approach. Reactive sputtering allows for rapid deposition of stoichiometric films and the ion assist part allows for atomic scale heating which helps control the stress, density and hardness of the deposited films. Also, by controlling the sputtering parameters and gas flow during the formation of the nano-layers, the refractive index can be adjusted so that the result of $(n_1-n_2)/(n_1+n_2)$ is less than 0.07 for the two nano-layers making up a bi-layer within a nano-laminate and the result of $(n_{1\mathit{eff}}-n_{2\mathit{eff}})/(n_{1\mathit{eff}}+n_{2\mathit{eff}})$ is greater than 0.1 for the effective indexes of the high and low nano-laminates.

The optical films may have high coefficient of friction, which means that, while they are very hard, they can be damaged by repeated abrasive contact. In order to protect the optical coating from abrasive wear, they may be coated with a lubricious film. This is shown by the dotted-line layers labeled DLC in FIGS. 3A-3C. In this example, the diamond-like coating (DLC) film is a highly hydrogenated DLC, having at least 20% hydrogen.

Additionally, for consumer display products, finger prints degrade the visual performance of the display. The final surface on these types of products should have an anti-smudge or anti-fingerprint (AF) coating. It is very difficult for fluorocarbon materials typically used for anti-fingerprint applications to adhere to DLC. To improve adhesion a two-layer film is used between DLC and AF coating. A thin silicon film is deposited over the DLC to protect the DLC from oxygen used to create the second SiO2 layer. The resulting stack is illustrated in FIG. 3D, but similar capping layers of DLC, Si, SiO2, and AF, can be formed on any of the embodiments of FIGS. 3A-3C.

It should be understood that processes and techniques described herein are not inherently related to any particular apparatus and may be implemented by any suitable combination of components. Further, various types of general purpose devices may be used in accordance with the teachings described herein. The present invention has been described in relation to particular examples, which are intended in all respects to be illustrative rather than restrictive. Those skilled in the art will appreciate that many different combinations will be suitable for practicing the present invention.

Moreover, other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

The invention claimed is:

1. An optical coating, comprising:
   a plurality of low refractive index layers, each having a first refractive index;
   a plurality of high refractive index layers each having a second refractive index which is higher than the first refractive index;
   wherein the low refractive index layers and the high refractive index layers are arranged alternatingly in interlaced manner to form a stack;
   wherein each of the low refractive index layers and high refractive index layers comprises a nano-laminate layer made up of alternating nano-layers of two different materials.

2. The optical coating of claim 1, wherein the each of the nano-layers has a thickness of from 2 nm to 10 nm.

3. The optical coating of claim 1, wherein:
   when the at least one layer is selected from the low refractive index layers, each of the two different materials is selected to have refractive index having value closer to the first refractive index than the second refractive index; and,
   when the at least one layer is selected from the high refractive index layers, each of the two different materials is selected to have refractive index having value closer to the second refractive index than the first refractive index.

4. The optical coating of claim 1, wherein:
   in the low refractive index layers, each of the two different materials is made up of an oxide material; and,
   in the high refractive index layers, each of the two different materials is made up of a nitride material.

5. The optical coating of claim 1, wherein:
   each of the plurality of low refractive index layers comprises two different materials having refractive index value closer to the first refractive index than the second refractive index;
   each of the plurality of high refractive index layers comprises two different materials having refractive index value closer to the second refractive index than the first refractive index.

6. The optical coating of claim 1, wherein within the a nano-laminate layer the two different materials are selected such that the expression $(n_1-n_2)/(n_1+n_2)\leq 0.07$ is satisfied, wherein $n_1$ and $n_2$ are the refractive indexes of the two different materials.

7. The optical coating of claim 1, wherein:
each of the plurality of low refractive index layers comprises two different materials having refractive indexes $n_1$ and $n_2$, respectively, and wherein the expression $(n_1-n_2)/(n_1+n_2) \leq 0.07$ is satisfied;
each of the plurality of high refractive index layers comprises two different materials having refractive indexes $n_i$ and $n_j$, respectively, the expression $(n_i-n_j)/(n_i+n_j) \leq 0.07$ is satisfied.

8. The optical coating of claim 7, wherein the expression $(n_f-n_s)/(n_f+n_s) \geq 0.10$ is satisfied, wherein of equals the first refractive index and $n_s$ equals the second refractive index.

9. The optical coating of claim 1, wherein the two different materials of the high refractive index layers are made from two or more of the following: ZrO2, ZrN, Si3N4, TiO2, Nb2O5, Ta2O5, CrO2, WO3.

10. The optical coating of claim 1, wherein the two different materials of the low refractive index layers are made from two or more of the following: SiO2, $Al_2O_3$, SiOxNy, SixAlyOz.

11. The optical coating of claim 1, further comprising a diamond-like carbon coating (DLC) formed over the stack.

12. The optical coating of claim 11, further comprising:
a silicon layer formed over the DLC;
an SiO2 layer formed over the silicon layer; and,
an anti-fingerprint (AF) layer formed over the SiO2 layer.

13. An optical coating comprising:
a plurality of first layers having a first refractive index;
a plurality of second layers having a second refractive index different from the first refractive index;
wherein the plurality of first layers and the plurality of second layers are formed alternatingly in an interlaced manner over a substrate, terminating with one layer from the plurality of second layers; and,
a top layer formed over the one layer, the top layer comprising a nano-laminate having a plurality of bi-layers, each bi-layer comprising two nano-layers made of different materials, such that the effective refractive index of the top layer has a value closer to the first refractive index than the second refractive index;
wherein the different materials are made from two or more of the following: SiO2, Al2O3, SiOxNy, SixAlyOz.

14. The optical coating of claim 13, the different materials are selected such that the expression $(n_1-n_2)/(n_1+n_2) \leq 0.07$ is satisfied, wherein $n_1$ and $n_2$ are the refractive indexes of the different materials.

15. The optical coating of claim 14, wherein effective refractive index $n_{eff}$ of the top layer satisfies the expression $|(n_{eff}-n_s)/(n_{eff}+n_s)| \geq 0.10$, wherein $n_s$ is the refractive index of the one layer.

16. The optical coating of claim 15, wherein the different materials are made from two or more of the following: ZrO2, ZrN, AlN, Si3N4, TiO2, Nb2O5, Ta2O5, CrO2, WO3.

17. The optical coating of claim 15, further comprising a diamond-like coating (DLC) formed over the top layer.

18. The optical coating of claim 17, further comprising:
a silicon layer formed over the DLC;
an SiO2 layer formed over the silicon layer; and,
an anti-fingerprint (AF) layer formed over the SiO2 layer.

* * * * *